(12) United States Patent
Albrecht (10) Patent No.: US 9,208,329 B2
(45) Date of Patent: Dec. 8, 2015

(54) SYSTEMS AND METHODS FOR MONITORING DOCUMENT LIFE CYCLE AND DESTRUCTION

(71) Applicant: Lexmark International Technology SA, Meyrin (CH)

(72) Inventor: Kevin James Albrecht, Shawnee, KS (US)

(73) Assignee: Lexmark International Technology, S.A., Meyrin (CH)

( * ) Notice: Subject to any disclaimer, the term of this patent is extended or adjusted under 35 U.S.C. 154(b) by 99 days.

(21) Appl. No.: 14/145,809

(22) Filed: Dec. 31, 2013

(65) Prior Publication Data

US 2015/0186654 A1 Jul. 2, 2015

(51) Int. Cl.
*G06F 21/60* (2013.01)

(52) U.S. Cl.
CPC ..................... *G06F 21/60* (2013.01)

(58) Field of Classification Search
CPC combination set(s) only.
See application file for complete search history.

(56) References Cited

U.S. PATENT DOCUMENTS

| | | | |
|---|---|---|---|
| 6,088,119 A * | 7/2000 | Manchala et al. | 358/1.14 |
| 6,704,118 B1 | 3/2004 | Hull et al. | |
| 8,154,769 B2 * | 4/2012 | McFarland et al. | 358/400 |
| 2003/0088518 A1 * | 5/2003 | Kirk et al. | 705/62 |
| 2003/0112270 A1 | 6/2003 | Newell et al. | |
| 2005/0172151 A1 | 8/2005 | Kodimier et al. | |
| 2007/0283446 A1 | 12/2007 | Yami et al. | |
| 2008/0011888 A1 * | 1/2008 | Dziesinski et al. | 241/58 |
| 2008/0163364 A1 * | 7/2008 | Ferlitsch | 726/21 |
| 2009/0070348 A1 | 3/2009 | Uejo | |
| 2010/0098336 A1 | 4/2010 | Takahashi et al. | |
| 2010/0171993 A1 | 7/2010 | Longobardi et al. | |
| 2012/0203785 A1 | 8/2012 | Awada | |
| 2013/0198244 A1 * | 8/2013 | Albrecht et al. | 707/812 |

OTHER PUBLICATIONS

U.S. Appl. No. 14/145,817, entitled "Systems and Methods for Monitoring Document Life Cycle and Destruction", filed Dec. 31, 2013.
U.S. Appl. No. 14/145,825, entitled "Systems and Methods for Monitoring Document Life Cycle and Destruction", filed Dec. 31, 2013.
Non-final Office Action for U.S. Appl. 14/145,825, filed May 13, 2015.

* cited by examiner

*Primary Examiner* — Beemnet Dada (57) ABSTRACT

Systems and methods for monitoring and managing documents printed by an imaging device, including receiving an electronic copy of a document printed by the imaging device and metadata associated with the document, automatically storing the electronic copy of the document and the associated metadata, associating a time period with the stored electronic copy and the associated metadata, the time period being a time during which the document is available for use. The methods further include automatically sending a notification, after the time period has elapsed, to a user, the notification requesting that the document needs to be destroyed.

16 Claims, 6 Drawing Sheets

SYSTEMS AND METHODS FOR MONITORING DOCUMENT LIFE CYCLE AND DESTRUCTION

CROSS REFERENCE TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Technical Field

The present disclosure relates to document processing and, more particularly, the tracking and monitoring of processed documents.

2. Description of the Related Art

Organizations, whether private or public, generate, collect and share a multitude of documents containing data and information relevant to their business operations every day, and oftentimes many of such documents contain information that is proprietary and confidential in nature. In many cases, confidentiality is vital to the success of the organization. For example, preserving the confidentiality of certain governmental documents is critical to national security, and preserving the confidentiality of corporate documents is key to maintaining trade secrets. Thus, the unauthorized disclosure of confidential documents may result in unwanted and unwelcome effects.

One device that has the potential to be used as an instrumentality in the unauthorized disclosure of information in hard copy or electronic form is a multi-function printing device. Printed copies of various documents can be a rich source of sensitive information when procured by scrupulous or malicious individuals or entities. In some instances, paper documents that are scanned, printed or copied may be distributed by various means, such as electronically or in-person delivery, without proper authorization. In other instances, paper documents containing sensitive information are kept in use long after their retention periods have elapsed, and as a result, are either forgotten or disposed of in a non-secure manner, if they are even disposed of at all. Such sensitive documents pose a security issue for any organization.

Based upon the foregoing, there is a need for an improved approach to securely handling printed documents.

SUMMARY

Systems and methods for capturing, monitoring and managing documents printed by an imaging device are disclosed. One example method of monitoring one or more documents printed by an imaging device may include receiving an electronic copy of a document printed by the imaging device and metadata associated with the document, automatically storing the electronic copy of the document and the associated metadata, associating a time period with the stored electronic copy and the associated metadata, the time period being a time during which the document is allowed to be in paper form. The one example method further includes automatically sending a notification, after the time period has elapsed, to a user requesting that the document needs to be destroyed.

In one aspect, the associated metadata includes a document identifier encoded on each page of the printed document. In another aspect, the received metadata may include a user identifier and the associated time period is determined based on the user identifier. In another aspect of one example method, the received metadata may include an imaging device identifier and the associated time period is determined based on the imaging device identifier.

In one aspect, the automatically sending is performed upon the time period elapsing from a time the document is printed by the imaging device.

In one aspect of the one example method, the electronic copy is tagged as active while the time period has not elapsed and tagged as inactive upon receiving an indication that the printed document has been destroyed.

An example method of managing printed documents may include maintaining a database containing electronic copies corresponding to documents printed by at least one imaging device, receiving a document identifier associated with each page of a printed document that has recently been destroyed, searching the database for an electronic copy of each page of the printed document corresponding to the received document identifier. The method further includes updating the database by tagging the found electronic copy of the printed document as inactive to indicate that the printed document corresponding to the document identifier has been destroyed by the document destruction device.

In one aspect of the example method, around the time the database is updated, automatically sending a confirmation to a user that the documents have been destroyed.

Other embodiments, objects, features and advantages of the disclosure will become apparent to those skilled in the art from the detailed description, the accompanying drawings and the appended claims.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

The following description and drawings illustrate embodiments sufficiently to enable those skilled in the art to practice the present disclosure. It is to be understood that the disclosure is not limited to the details of construction and the arrangement of components set forth in the following description or illustrated in the drawings. The disclosure is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some example embodiments may be included in or substituted for those of others. The scope of the present application encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, the terms "a" and "an" herein do not denote a limitation of quantity but rather denote the presence of at least one of the referenced item.

It will be further understood that each block of the example flowcharts or diagrams, and combinations of blocks in the example flowcharts or diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block of the diagrams or combinations of blocks in the diagrams discussed in detail in the description below.

These computer program instructions may also be stored in a non-transitory computer-readable memory that may direct a computer or other programmable data processing apparatus to function in a particular manner, such that the instructions stored in the computer-readable memory produce an article of manufacture, including an instruction means that implements the function specified in the block or blocks. The computer program instructions may also be loaded onto a computer or other programmable data processing apparatus to cause a series of operational actions or steps to be performed on the computer or other programmable apparatus to produce a computer implemented process such that the instructions that execute on the computer or other programmable apparatus implement the functions specified in the block or blocks.

Accordingly, blocks of the example flowcharts and diagrams support combinations of means for performing the specified functions, combinations of actions or steps for performing the specified functions and program instruction means for performing the specified functions. It will also be understood that each block of the diagrams, and combinations of blocks in the diagrams, may be implemented by special purpose hardware-based computer systems or combinations of special purpose hardware and computer instructions that perform the specified functions, actions or steps.

Disclosed are systems and methods for monitoring and managing documents printed by an imaging device. In general terms, the method of monitoring includes receiving, from an imaging device, an electronic copy of a printed document and metadata associated with the document, automatically storing the electronic copy of the document and the associated metadata, associating a time period with the stored electronic copy and the associated metadata, and after the time period has elapsed, automatically sending a notification to a user who requested printing of the document that the printed document needs to be destroyed. A method of managing printed documents generally includes maintaining a database containing electronic copies corresponding to documents printed by an imaging device, receiving a document identifier associated with each page of a printed document recently destroyed, searching the database for an electronic copy of each page of the printed document corresponding to the received document identifier, and tagging the electronic copy of the printed document as inactive to indicate that each page of the printed document corresponding to the document identifier has been destroyed. By managing the time period during which a printed document is allowed to exist and maintaining the status of each page of printed documents, the likelihood of a security breach associated with the printed documents is substantially reduced.

Figure 1:
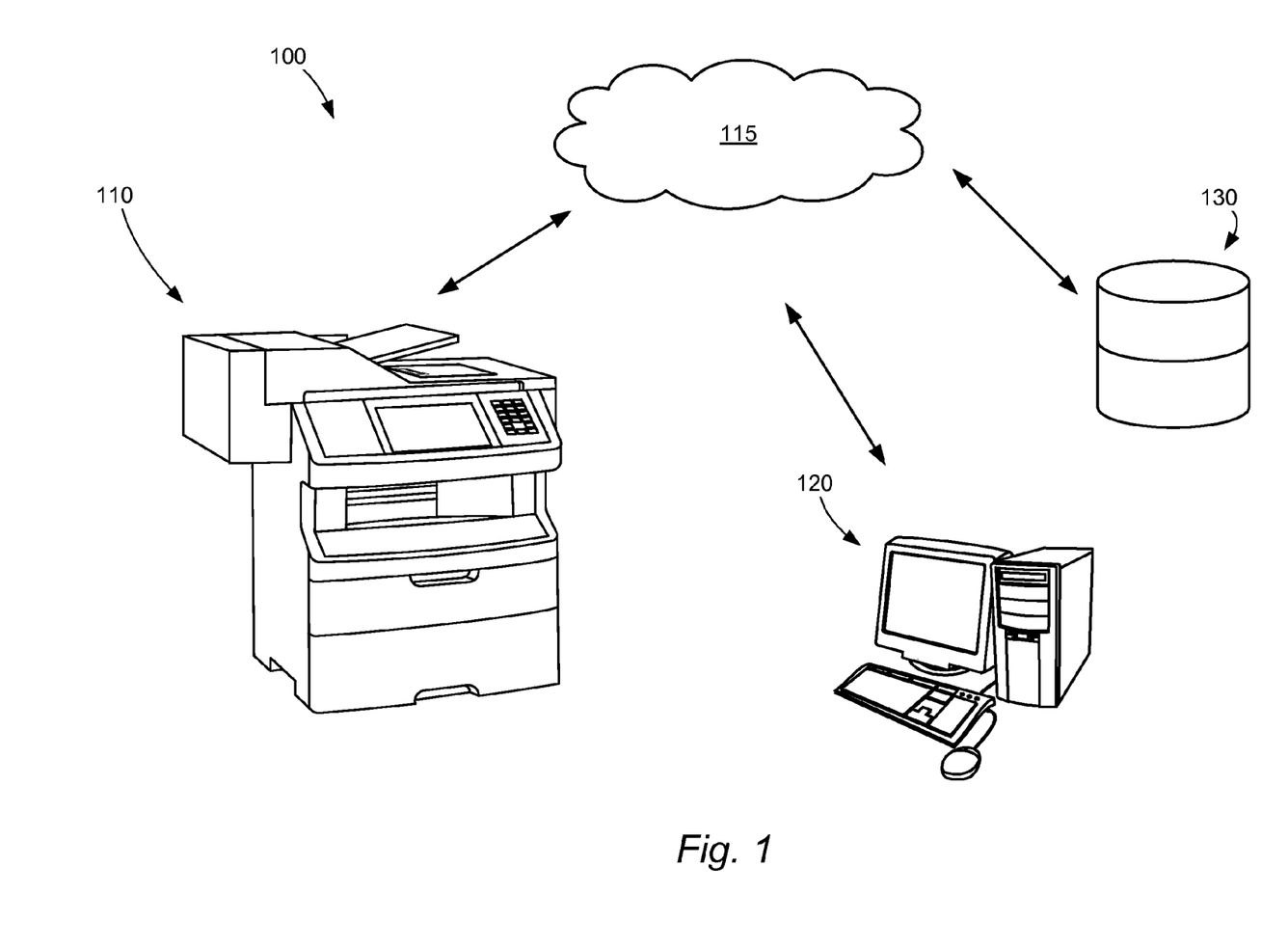
FIG. 1 is one example embodiment of a system including an imaging device, a computer and data storage connected to a network.

With reference to FIG. 1, there is shown an example system 100 including an imaging device 110, a network 115, a computer 120 and data storage 130. Imaging device 110 may be connected to computer 120 via network 115. Imaging device 110 may also communicate with data storage 130 through network 115. In other example embodiments, imaging device 110 may be web-enabled and may communicate with computer 120 and/or data storage 130 via a direct connection to network 115. In yet other example embodiments, imaging device 110 may be locally connected to computer 120 and/or data storage 130 in a non-networked manner.

Imaging device 110 may be any device capable of printing or producing an electronic or a hard copy of a data file or document, such as a laser, inkjet or dot matrix printer. In some example embodiments, imaging device 110 may be a multi-function printing device that has the capability of performing additional functions, such a faxing, e-mailing, scanning and/or copying, in addition to printing.

With continued reference to FIG. 1, network 115 may be any communications network such as, but not limited to, a peer-to-peer network, a hybrid peer-to-peer network, a LAN, a WAN or cellular network. Network 115 may be a public network, such as the Internet or a private network. Imaging device 110 may operate in a networked environment using logical connections to one or more other computing configurations, such as computer 120. Computer 120 may be a personal computer, a server, a router, a network PC, a peer device or other common network node.

In the example embodiment shown in FIG. 1, computer 120 may include at least one computer-readable storage medium having stored thereon a search module or application and an optical character recognition (OCR) application. In some other example embodiments, computer 120 may include an optical mark recognition (OMR) application in addition to or in lieu of an OCR application. Computer 120 may also include one or more user input devices, such as a keyboard or mouse and a display monitor. In some alternate example embodiments, display monitor may include functionality of user input devices such as in a touch screen display, thereby eliminating the need for separate user input devices for computer 120.

Computer 120 may be connected to data storage 130 over network 115 via one or more communications links. In some example embodiments, data storage 130 may be accessed via a web-based function or via a cloud computing communication link. Data storage 130 may be a data storage device, a designated server system or computing system, or a designated portion of one or more server systems or computing systems. In another example embodiment, data storage 130 may be a security system provider computing system, a distributed database or an external and/or portable hard drive. In still other example embodiments, data storage 130 may be a dedicated mass storage device implemented in software, hardware, or a combination of hardware and software. Data storage 130 may store image data and/or document files and/or metadata.

In some alternate example embodiments, data storage 130 may be a data storage or mass storage device located in computer 120. Additionally, although example system 100 of FIG. 1 shows only one imaging device 110, one computer 120 and one data storage 130, those of ordinary skill in the art will appreciate that example system 100 may have additional components and/or multiples of the components enumerated in this disclosure.

Imaging device 110 may include various components, such as a processor, a network communications interface, user interface, a memory, a control unit and a print engine. Multifunction printing devices may have additional components, such as a scanning subsystem, modem, keyboard and/or other user input device. The control unit of imaging device 110 may include an embedded solution or application for controlling or otherwise cooperating with the scanning subsystem to capture the image data of documents, such as documents processed and/or printed by imaging device 110, and the metadata associated with the printed documents.

In some example embodiments, the control unit of imaging device 110 may also include an embedded solution having the capability of collecting and encoding the metadata associated with the documents onto each printed page in the form of an optical machine-readable mark, such a bar code or a Quick Response (QR) code, such that each page of the printed document includes the encoded metadata associated therewith. The encoded metadata serves as a document identifier, identifying each page of the printed document. In some example embodiments, the embedded solutions may be a software module or application that may be stored in a non-transitory computer readable storage medium associated with the control unit and executed by the control unit in accordance with programmed logic associated with the software application or module. In some alternate example embodiments, the embedded solutions or applications may reside on a device separate from imaging device 110 but communicatively coupled to imaging device 110.

The metadata associated with a document refers to data or information that describes and/or provides information related to the document processed and/or printed by imaging device 110. Metadata may include at least one of user identification information, device information and document processing/printing information. In some example embodiments, user identification information may include a name or an identifier of the user requesting the document processing. User identification information may also include a department or user group to which the user belongs. Device information may include an imaging device identifier, such as an Internet Protocol (IP) address, a Media Access Control (MAC) address, a network name and/or a network gateway associated with imaging device 110. Document processing information may include details of the document processing performed by imaging device 110, such as the type of processing carried out or performed by imaging device 110 (e.g. printing, copying, scan-to-email, etc.), the number of pages processed, and/or the date and/or time of the document processing.

Processing details may vary depending upon the processing type. For example, processing details associated with a printing transaction may include the number of pages printed, the number of copies printed and/or finishing options, such as duplex or simplex printing, stapling, collating and n-up printing. Processing details associated with a scanning transaction may include, but are not limited to, the number of scanned pages and/or scanning destination, such as the drive or folder location. Though imaging device 110 may process a document in a number of different ways (e.g., print, scan, facsimile, etc.), because system 100 is directed to the creation and destruction of printed documents, the processing described below will mostly be associated with printing by imaging device 110. It is understood, though, that the capturing, monitoring and managing operations of system 100 as described herein may be with respect to any image received by imaging device 110, for any processing operation to be performed thereon.

Figure 2:
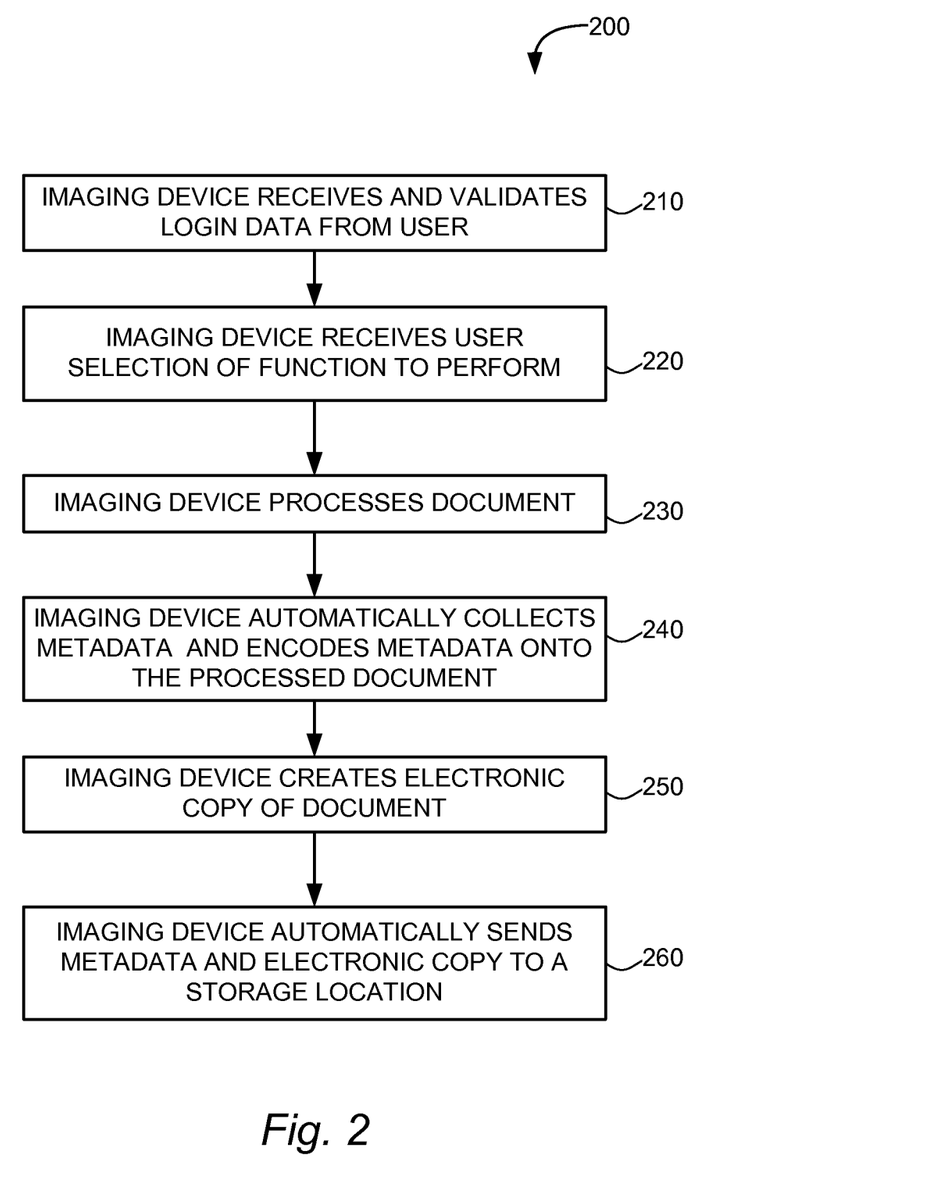
FIG. 2 is an example flowchart of one example method associated with processing documents using the example system of FIG. 1.

FIG. 2 is a flowchart 200 of an example method for processing documents at imaging device 110. The method may be performed by an imaging device 110, and may include receiving and validating a user's access to the imaging device 110, processing a document as initiated by the user, automatically collecting metadata and creating an electronic copy of the processed document, and sending the collected metadata and electronic copy to data storage 130.

Imaging device 110 may require a user to log onto imaging device 110 and provide user authentication details before allowing the user to access functions available in imaging device 110. At block 210, imaging device 110 may receive and validate a user's login data and access to imaging device 110. Login data may include authentication details provided to imaging device 110 through the use of a common access card (CAC), identification card, secure card or any other smart card. Such cards may contain user information that may be used to authenticate, confirm or verify the identity of the user. For example, the user may log in to imaging device 110 by swiping an appropriate smart card containing authentication or user information at a card reader communicatively coupled to imaging device 110. In other example embodiments, the log in process may include imaging device 110 prompting the user for authentication or security credentials prior to allowing the user access to imaging device 110. For example, the user may be prompted to enter authentication information, such as a username and password, via the user input device of imaging device 110. It will be understood by one of ordinary skill in the art that the smart card may contain other information about the user, such as a user identifier and/or his personal preferences, such as duplex printing, which may be automatically provided or transmitted to imaging device 110 upon authentication of the user.

At block 220, the user may select a process or function available in imaging device 110 to initiate processing of a desired document. As mentioned, available processes or functions may include the printing, e-mailing, scanning, faxing or copying of the desired document. For example, upon logging in to imaging device 110, the user may elect or choose to print the one or more documents.

The document on which the selected process or function is to be performed may either be a hard copy or be in electronic form. The document may be associated with a particular project or belong within a particular category or group of document types. For example, the document may be part of a project named "Project Alpha" and may be highly sensitive internal memorandum within an organization.

In some alternate example embodiments, the user may select the desired document processing function prior to entering his credentials on imaging device 110. In some example embodiments, the authentication process at block may include verifying or confirming that the user is authorized to access the desired document processing function in addition to verifying that the user is authorized to use imaging device 110.

At block 230, imaging device 110 may process the document according to the process or function selected by the user, for example, printing, by automatically generating or creating the image data necessary to complete the desired process on the document. Image data of the document may refer to the document in virtually any image format, such as .tiff, .gif, .jpeg or .bmp. In an example embodiment, image data may refer to another document or file format, such as .pdf. Generating the image data may include making a first copy or instance of the document and performing the desired process or function on such copy or instance. For example, when a user of imaging device 110 prints a document, imaging device 110 may render the document in a printable format and produce a printed output from the rendered document.

At around the same time as the document is processed, imaging device 110 may at block 240 identify metadata associated with the document processing and/or the document itself. For example, when the user initiates printing of a document, imaging device 110 may process the document by printing a first copy of the document and identifying metadata associated with the document processing. As described earlier, metadata for a printing transaction include the number of pages printed, the number of copies printed and/or finishing options, such as duplex or simplex printing, stapling, collating and n-up printing. The collected metadata serves as a document identifier, unique to each page of the printed document. In an example embodiment, the collected metadata is included on each page of the document printed in block 230 as a machine-readable mark, such as a barcode.

At block 250, imaging device 110 may also automatically generate or create a second copy of the document, wherein the second copy is in electronic form. The second copy may be the image data of the document printed. For example, when the user initiates printing of a document, imaging device 110 may process the document by printing a first copy of the document, as described above, and capturing the image data of the document printed, thereby creating the second copy. In some alternate example embodiments, imaging device 110 may only generate or create an electronic copy and identify the corresponding metadata for a subset of documents processed by imaging device 110. For example, the electronic copies of documents and their corresponding metadata may only be generated and identified for documents meeting a specific criteria or condition such as, for example, a particular project, time period, user group, document type or transaction type.

At block 260, imaging device 110 automatically sends the electronic copy of the document and the metadata associated with the printed document to data storage 130. The user of imaging device 110 may or may not be informed or notified, either electronically or otherwise, by imaging device 110 that a second copy of the document and the metadata associated with the processed document are sent to data storage 130.

Figure 3:
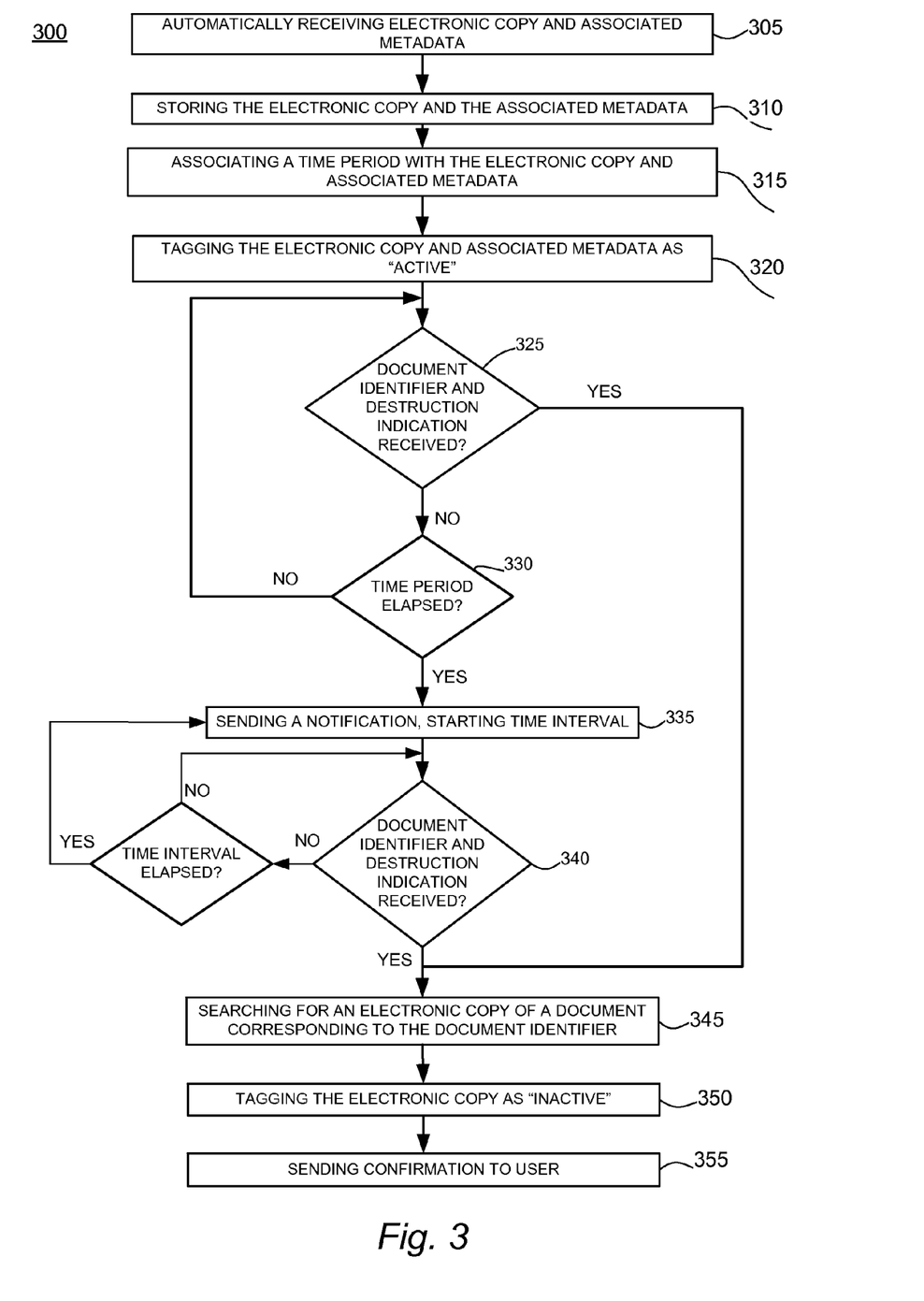
FIG. 3 shows an example flowchart of one example method associated with storing electronic copies of a plurality of documents in the example system of FIG. 1.

FIG. 3 shows an example flowchart 300 of one example method for monitoring the life cycle and destruction of a plurality of printed documents. The method shown in FIG. 3 may be performed by data storage 130, and may include automatically receiving an electronic copy and metadata associated with a document processed by imaging device 110, storing the electronic copy and metadata in a database in data storage 130, and associating a time period with the electronic copy and metadata and tagging the electronic copy and metadata in as active. The stored electronic copy and metadata retain active status until data storage 130 receives a document identifier corresponding to the electronic copy and a destruction indication. If no document identifier and destruction indication is received by data storage 130 when the time period associated with the electronic copy elapses, data storage 130 may send a notification to a user or other individual, requesting that the printed document corresponding to the electronic copy be destroyed. Once the printed document has been destroyed, and data storage 130 has received the corresponding document identifier and destruction indication, data storage 130 tags the electronic copy as inactive.

At block 305, data storage 130 may automatically receive an electronic copy of each document processed by imaging device 110 and its corresponding metadata. In some example embodiments, computer 120 may automatically receive the electronic copy of a subset of documents processed by imaging device 110 together with their corresponding metadata. For example, the second copies of documents and their corresponding metadata may only be received for documents meeting a specific criteria or condition, such as, for example, a specific imaging device time period, user group, document type or transaction type. It is understood that data storage 130 may receive electronic copies of documents processed by any number of imaging devices in system 100, together with the metadata corresponding to the electronic copies.

At block 310, the electronic copy and metadata may be stored in data storage 130. At block 315, data storage 130 associates a time period with the stored copy and metadata. The time period is the time wherein a printed copy of the document may be allowed to exist in paper form or otherwise, and when the said time period expires, the document must be destroyed. The time period may be predetermined. Further, the time period may be configured by an authorized user of system 100. In some example embodiments, the time period may be determined based on the imaging device information from the metadata. In other example embodiments, the user who printed the document may be allowed to set the time period, such as at the time of printing. In still other embodiments, the time period may be determined based on the metadata user information. For example, an imaging device 110 being used by a company's legal department may have a different time period associated to documents the imaging device 110 processes than an imaging device 110 being used by the same company's public relations department. Further, a user processing a document at a shared imaging device 110 may have a different time period associated with the documents processed at the imaging device 110 than another user processing a document at the same shared imaging device 110. Data storage 130 may begin monitoring the associated time period using a timer or other device performing a timing function.

At block 320, the stored copy and metadata may be tagged as active in data storage 130. The stored electronic copies and metadata retain the active status until an indication that the corresponding printed documents have been destroyed is received by data storage 130, as will be explained in more detail below.

Throughout the associated time period during which a printed copy of a document may be allowed in circulation, data storage 130 may determine at block 325 whether a document identifier and a destruction indication have been received. If a document identifier and a destruction indication have been received, the data storage 130 proceeds to block 345. If no document identifier and destruction indication is received, the data storage 130 proceeds to block 330.

At block 330, the data storage 130 may determine whether the time period associated with the stored copy has elapsed. Upon a positive determination at block 330, the data storage 130, at block 335, may send a notification to a user identified from the metadata of the stored electronic copy and/or a person having data retention responsibilities. The notification may contain a request or reminder to destroy the printed copy of the stored copy and may further contain information contained in the metadata, such as the number of pages printed.

At block 340, the data storage 130 may again determine whether a document identifier and a destruction indication that the printed document corresponding to the stored copy has been destroyed have been received. If, after a time interval following the completion of the associated time period, no document identifier and destruction indication are received, the data storage 130 sends a second notification at block 335. The data storage 130 will continue to send notifications to the user, such as at set time intervals, until the data storage 130 receives the corresponding document identifier and the destruction indication. In some example embodiments, the data storage 130 may also send a notification to other relevant parties, such as the user's immediate superior or a person having data retention responsibilities, if no document identifier and destruction indication is received after a number of time intervals. Once the document identifier and destruction indication has been received, the data storage 130 proceeds to block 345.

At block 345, data storage 130 may search for a stored copy of a document corresponding to a received document identifier. At block 350, data storage 130 may tag the corresponding stored copy as inactive, signifying that the printed document corresponding to the electronic copy has been destroyed. In an example embodiment, data storage 130 may be configured to allow an operator of system 100 to tag electronic copies as active and inactive. In some example embodiments, each document identifier corresponds to each page of a document, such that a document comprised of multiple pages may have multiple document identifiers that need to be received by data storage 130 in order for all pages of the document to be tagged as inactive.

At block 355, data storage 130 may send a confirmation message to the user or person having data retention responsibilities. The confirmation may include information about the stored copy, such as the number of pages tagged as inactive. In one embodiment, the confirmation may be in the form of an email. In another embodiment, imaging device 110 may send the confirmation instead of or in addition to storage 130, and the confirmation may be in email form, hardcopy form or both. As shown in FIG. 3 and particularly the flow from the affirmative output of decision block 325, blocks 345 to 355 may be executed upon the receipt of a document identifier and a destruction indication, regardless of whether or not the time period associated with the stored copy corresponding to the document identifier has elapsed.

In one aspect of some example embodiments, the data storage 130 retains the stored copies tagged as inactive in its database such that an authorized user may perform a search or otherwise monitor the database in data storage 130 for active or inactive stored copies. In alternative example embodiment, data storage 130 deletes the stored copies tagged as inactive. Deletion may occur upon a change in the status of the stored copies from active to inactive, or after a predetermined amount of time.

Figure 4:
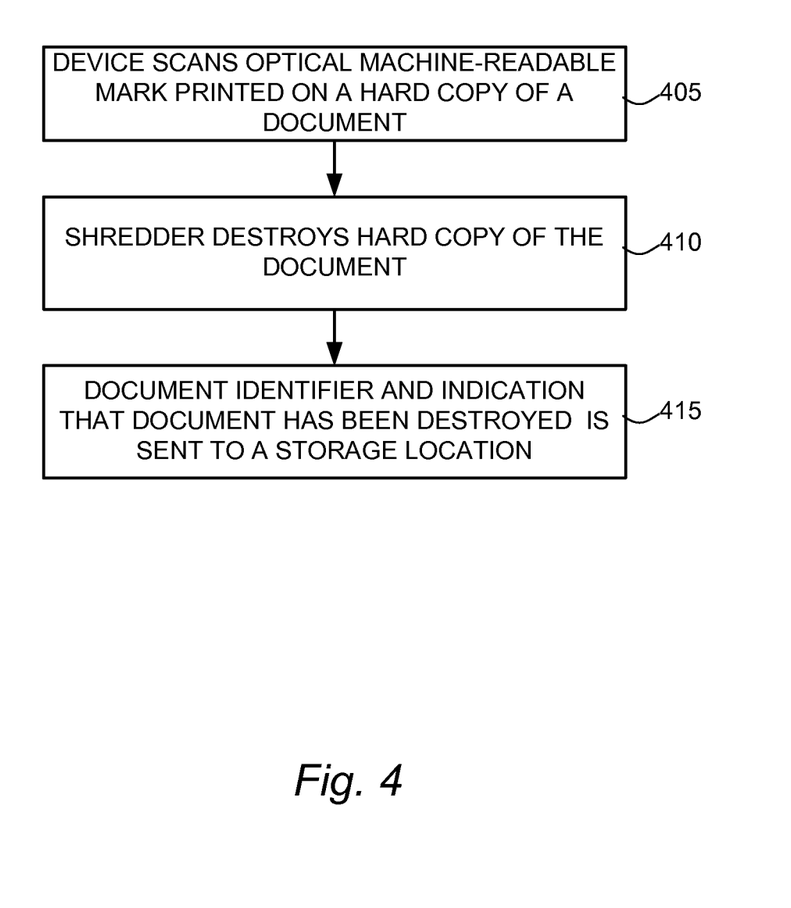
FIG. 4 is an example flowchart of on example method associated with destroying a document using the example system of FIG. 1.

FIG. 4 shows an example flowchart for an example method associated with destroying a printed document. The method includes scanning an optical machine-readable mark of a printed document and capturing and determining a document identifier from the scanned mark, destroying the hard copy of the document, and automatically sending the document identifier together with a destruction indication to data storage 130. This method may be performed automatically by a standalone scanner-shredder device connected within system 100, or multifunction imaging device 110 having a scanner-shredder subsystem. Alternatively, the scanning and destroying steps may also be performed employing separate scanning and shredding devices.

At block 405, a scanning device scans an optical machine-readable mark on a page of the printed document to capture a document identifier encoded therein. At block 410, once the optical machine-readable mark is scanned, the page of the printed document is fed to a document destruction device, such as a shredder, for destruction. At block 415, a processor coupled to the scanning device identifies the document identifier and sends the document identifier to data storage 130, along with an indication that the corresponding page of the printed document has been destroyed. In some example embodiments, the destroying of block 410 and the sending of block 415 may occur substantially simultaneously. In an example embodiment, the activities of block 415 may be carried out prior to the document being destroyed in block 410, and the processor associated with the scanning device and the document destruction device may wait for confirmation from data storage 130 that the electronic copy of the document has been tagged as inactive before the document is destroyed by the document destruction device in block 410. When data storage 130 receives the document identifier and indication corresponding to the page of the printed document that has been destroyed, data storage 130 performs blocks 345, 350 and 355 as described above with respect to FIG. 3.

Figure 5:
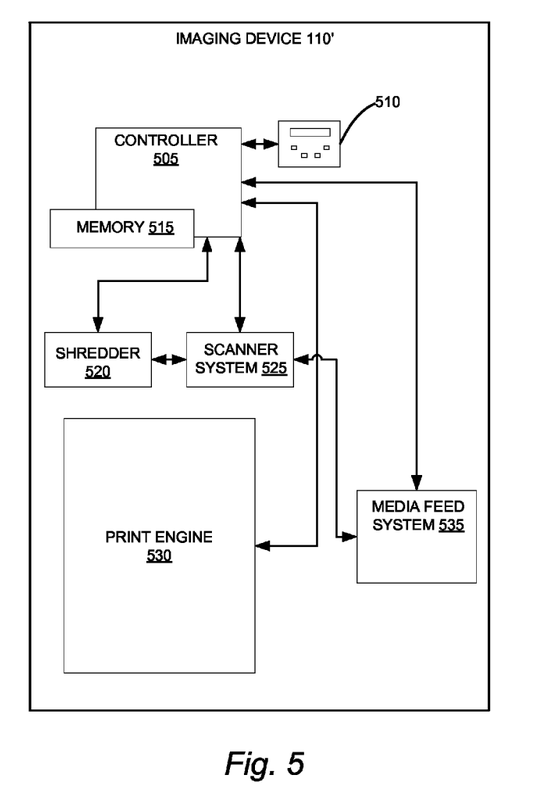
FIG. 5 is a block diagram of an example imaging apparatus utilizing a scanner-shredder system of the present disclosure.

As mentioned above, the method of FIG. 4 may be performed by a standalone device having a combination scanner and shredder and by an imaging device 110 having scanning and shredding functionality. With respect to the latter, FIG. 5 is a block diagram of an example imaging device 110' utilizing a scanner-shredder subsystem. Imaging device 110' is shown as a multifunction device that includes a controller 505, a user interface 510, a shredder 520, a scanner system 525, a print engine 530, and a media feed system 535. Imaging device 110' may communicate with a computer, such as computer 120 of system 100.

User interface 510 is communicatively connected to controller 505. Controller 505 includes a processor unit and associated memory 515, and may be implemented as one or more Application Specific Integrated Circuits (ASICs). Memory 515 may be any volatile and/or non-volatile memory. Controller 505 may be, for example, a controller for controlling printing, scanning and shredding functions of imaging device 110'. Controller 505 serves to process print data and to operate print engine 530 during printing, operate scanner system 525 and process data obtained therefrom, as well as operate shredder 520. In some example embodiments, the user interface of imaging device 110' may be a graphical user interface, a monitor, a series of buttons, a touch-sensitive display panel, a voice-activated interface, a speaker or the like. In yet other example embodiments, the user interface may also serve as an input device for imaging device 110'.

Imaging device 110' may be connected to network 115 via one or more appropriate communication links (not shown), as will be understood by those of ordinary skill in the art. For example, the one or more communication links may be established by a direct cable or optical connection, by a wireless connection, and/or by a network connection such as, for example, an Ethernet local area network (LAN) or wide area network (WAN).

Programs, software/firmware modules or applications used in the operation of imaging device 110', or portions thereof, may be stored on local or remote memory storage devices and may be communicatively linked to various processing devices in the imaging device 110 for performing certain tasks.

Figure 6:
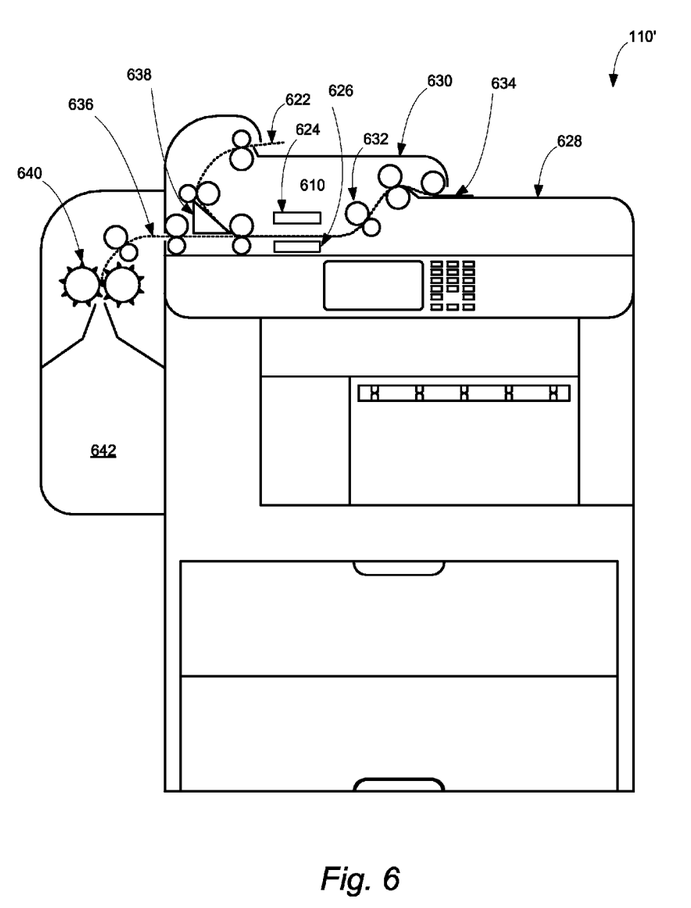
FIG. 6 illustrates the scanner-shredder system of FIG. 5 according to an example embodiment.

Referring to FIG. 6, there is shown a partial cross sectional view of imaging device 110' according to an example embodiment. Scanner system 525 may perform scanning for the scanning-shredding process of FIG. 4 as well as for more traditional operations associated with a multi-function device, such as copying and copy-to-email operations. Scanner system 525 may include scan units 624, 626 for capturing images located on either or both sides of a sheet of media. Alternatively, scanner system 525 may include a dedicated optical mark scanner, such as barcode scanner, for capturing optical marks on a page to be destroyed. Imaging device 110' may further include an automatic document feeder (ADF) 610, controlled by controller 505, for feeding sheets of media to and from scanner system 525. As shown in FIG. 6, ADF 610 may include a multi-path architecture having a generally C-shaped media path 620 disposed between input area 628 and output area 630, for performing the more traditional scan related operations associated with a multi-function product. In addition, ADF 610 may include an output path 636 for feeding sheets of media to shredder 520. ADF 610 may include a diverter 638 to select between sending a scanned media sheet to output area 630 or to shredder 520. Scan units and ADFs are well known in the art such that a detailed description thereof will not be provided for reasons of simplicity.

Scan units 624, 626 may be any imaging unit capable of capturing the contents of a page or representations of the contents of a page. Further, scan units 624, 626 may be controlled by controller 505 for capturing content on just a portion of a page or media object.

In example embodiments wherein the scanner-shredder system is operated as a standalone unit, a processor is coupled to the scanning device for extracting a document identifier from the captured optical machine-readable mark, and for sending the document identifier to data storage 130. In example embodiments wherein the scanner-shredder system is part of a multifunction device, the extracting and sending may be executed by controller 505.

It will be appreciated that the actions described and shown in the example flowcharts may be carried out or performed in any suitable order. It will also be appreciated that not all of the actions described in FIGS. 2, 3 and 4 needs to be performed in accordance with the example embodiments of the disclosure and/or additional actions may be performed in accordance with other embodiments of the disclosure.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific example embodiments disclosed and that modifications and other embodiments are intended to be included within the scope of the appended claims. Although specific terms are employed herein, they are used in a generic and descriptive sense only and not for purposes of limitation.

What is claimed is:

1. A method of monitoring one or more documents processed by an imaging device, comprising:
   receiving, from an imaging device, an electronic copy of a document printed by the imaging device and metadata associated with the document;
   tagging the electronic copy as active;
   automatically storing the electronic copy of the document and the associated metadata;
   associating a time period with the stored electronic copy and the associated metadata, the time period being a time during which the printed document is available for use;
   after the time period has elapsed, automatically sending a notification that the printed document needs to be destroyed; and
   receiving by a data storage an indication that the printed document has been destroyed and tagging by the data storage the electronic copy of the document as inactive to indicate that the printed document has been destroyed.

2. The method of claim 1, wherein the associated metadata comprises a user identifier corresponding to a user who requested printing of the document.

3. The method of claim 2, wherein the time period is determined based on the user identifier.

4. The method of claim 1, wherein the associated metadata comprises an imaging device identifier corresponding to the imaging device, wherein the associating the time period comprises associating the time period based upon the imaging device identifier.

5. The method of claim 1, wherein the automatically sending is performed upon the time period elapsing as measured from a time the document is printed by the imaging device.

6. The method of claim 1, wherein the associated metadata comprises a document identifier encoded on each page of the document.

7. A method of managing processed documents, comprising:
   maintaining a database containing electronic copies corresponding to documents printed by at least one imaging device;
   receiving, by a data storage from a device communicatively coupled to the data storage, a document identifier associated with a page of a printed document recently destroyed;
   searching the database for an electronic copy of the page of the printed document corresponding to the received document identifier;
   upon finding the electronic copy of the of the page of the printed document, updating the database by tagging the electronic copy of the printed document as inactive to indicate that the page of the printed document corresponding to the document identifier has been destroyed; and
   at substantially the same time the database is updated, sending, by the data storage, a confirmation message to a user that the page of the document corresponding to the document identifier has been destroyed.

8. The method of claim 7, further comprising automatically sending the confirmation to a second user.

9. The method of claim 7, wherein the updating comprises tagging the page of the electronic copy of the printed document as inactive.

10. A device with non-transitory computer-readable storage medium containing computer executable instructions to:

receive, from a imaging device, an electronic copy of a document printed by the imaging device and metadata associated with the document;

tag the electronic copy as active;

automatically store the electronic copy of the document and the associated metadata;

determine a time period with the stored electronic copy and the associated metadata, the time period being a time during which the printed document is available for use;

after the time period has elapsed, automatically send a notification that the printed document needs to be destroyed; and receive by a data storage an indication that the printed document has been destroyed and tag by the data storage the electronic copy of the document as inactive to indicate that the printed document has destroyed.

11. The storage medium of claim 10, wherein the associated metadata comprises a user identifier corresponding to a user who requested printing of the document, wherein the instructions to determine the time period comprises instructions to determine the time period based upon the user identifier.

12. The storage medium of claim 10, wherein the associated metadata comprises an imaging device identifier corresponding to the imaging device, wherein the instructions to determine the time period comprises instructions to determine the time period based upon the imaging device identifier.

13. The storage medium of claim 10, wherein the instructions to automatically send is comprises instructions to send the notification as measured from a time the document is printed by the imaging device.

14. The storage medium of claim 10, wherein the associated metadata further comprises a document identifier encoded on each page of the printed document.

15. The storage medium of claim 10, wherein the instructions include instructions to tag the printed document and the associated metadata as active.

16. The storage medium of claim 10, wherein the instructions include instructions to receive an indication that the printed document has been destroyed and tag each page of the electronic copy of the printed document as inactive to indicate that the printed document corresponding to the document identifier has been destroyed.

* * * * *